United States Patent [19]

Davis

[11] 4,170,337
[45] Oct. 9, 1979

[54] BICYCLE ACCESSORY

[76] Inventor: Milton S. Davis, 105 Oak Ave., Kentfield, Calif. 94904

[21] Appl. No.: 907,807

[22] Filed: May 19, 1978

[51] Int. Cl.² .......................................... F16M 13/00
[52] U.S. Cl. .............................. 248/475 R; 248/229; 248/231; 248/289 R; 362/72
[58] Field of Search ............... 248/229, 231, 475, 514, 248/515, 289 R; 224/30 A, 41; 362/72

[56] References Cited

U.S. PATENT DOCUMENTS

| | | | |
|---|---|---|---|
| 1,449,509 | 3/1923 | Graves | 362/72 X |
| 1,675,931 | 7/1928 | Gullette | 248/289 R |
| 1,735,212 | 11/1929 | Pawsat | 248/229 |
| 2,175,918 | 10/1939 | Saver | 248/289 |
| 2,540,584 | 2/1951 | Jaycox | 248/515 |
| 2,601,613 | 6/1952 | Jahncke | 248/229 |
| 2,663,531 | 12/1953 | Rubano | 248/231 |
| 3,592,430 | 7/1971 | Coombs | 248/289 R |

FOREIGN PATENT DOCUMENTS

| | | | |
|---|---|---|---|
| 151114 | 11/1931 | Switzerland | 362/72 |
| 355365 | 8/1961 | Switzerland | 362/72 |
| 213139 | 3/1924 | United Kingdom | 362/72 |
| 785300 | 10/1957 | United Kingdom | 248/229 |

Primary Examiner—William H. Schultz
Attorney, Agent, or Firm—Melvin R. Stidham

[57] ABSTRACT

A flashlight holder comprising a flexible, cylindrically concave clip to grip a flashlight, the clip being nested in a concave surface on one side of a resilient washer or rubber or like material having a high coefficient of friction. Threaded means secure the clip and washer to a flat surface, whereby the flashlight may be turned to any direction and be retained there by friction. In a preferred embodiment the resilient washer and clip are mounted on a flat base plate which, in turn, may be clipped to the handlebar of a bicycle.

3 Claims, 4 Drawing Figures

BICYCLE ACCESSORY

BACKGROUND OF THE INVENTION

Many bicycles are equipped with headlamps, but such have no particular utility except as a headlamp, and are not detachable. Others have provided flashlight holders to be carried on bicycles but these are of limited versatility in use.

OBJECTS OF THE INVENTION

It is an object of this invention to provide a flashlight carrier which may readily be removed for use apart from the bicycle.

It is a further object of this invention to provide a flashlight mounting which may be pointed and retained in any direction.

Other objects and advantages of this invention will become apparent from the description to follow, particularly when read in conjunction with the accompanying drawing.

SUMMARY OF THE INVENTION

In carrying out this invention, I provide a cylindrically concave clip of a flexible material, such as spring steel which is nested in the concave upper surface of a resilient washer having a high coefficient of friction. A bolt attaches the clip and washer to a base plate when it is gripped by a nut. Interposed between the nut and the opposite side of the base plate is a washer of a material having a low coefficient of friction whereby the flashlight and clip may be turned to any direction and there held in place by the frictional engagement of the resilient washer. For use on a bicycle, the base plate may have a flexible band ring which may be removably clamped to the handlebar of a bicycle. In this embodiment the base plate may also carry a light reflector.

DESCRIPTION OF THE PREFERRED EMBODIMENTS

Figure 2:
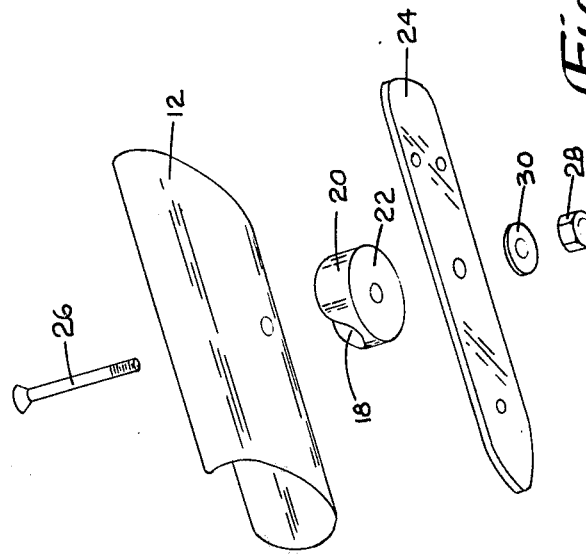
FIG. 2 is an exploded view of the FIG. 1 embodiment.
Figure 3:
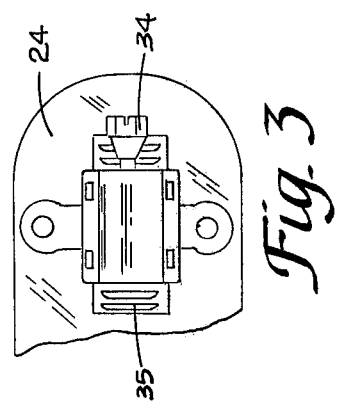
FIG. 3 illustrates a detail of a clamping means for mounting the flashlight holder on a bicycle handlebar.
Figure 1:
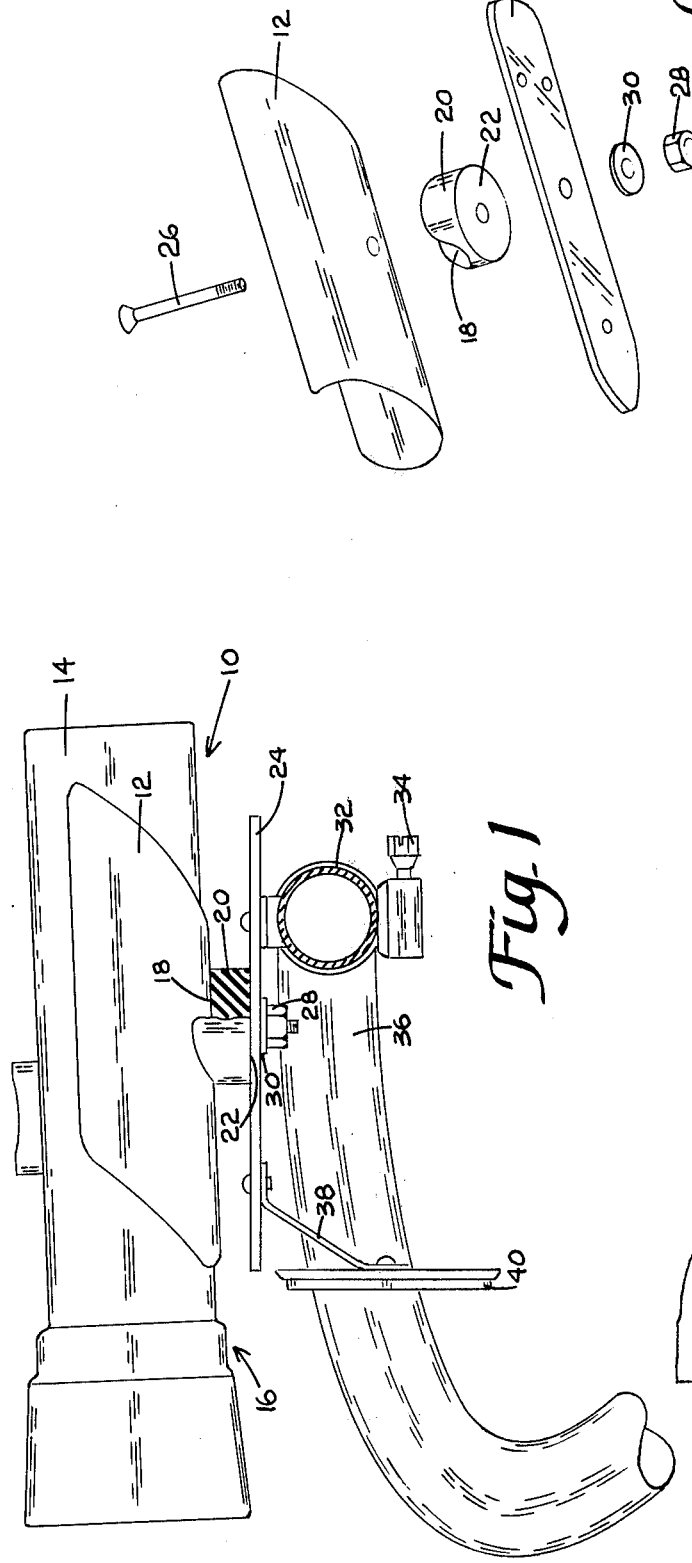
FIG. 1 is a side view of my flashlight holder mounted on a bicycle handlebar.

The Embodiments of FIGS. 1 to 3

Referring now to FIG. 1 with greater particularity the flashlight holder 10 of this invention includes a cylindrically concave clip 12 of spring steel or the like which is adapted to receive and firmly grip the cylindrical casing 14 of a standard flashlight 16. The flexible clip 12 is nested in the concave upper surface 18 (FIG. 2) of a washer 20 of natural or synthetic rubber or other material having a relatively high coefficient of friction.

The flat opposite surface 22 of the washer is adapted to be pressed against a complementary flat surface which, in the embodiment of FIG. 1 is in the form of a flat base plate of metal or suitable plastic, such as "Plexiglas".

A threaded screw 26 extends through the clip 12, washer 20 and base plate 24, whereby the entire assembly is secured firmly in place by a nut 28. Interposed between the nut 28 and the opposite surface of the base plate 24 is a washer 30 of a low friction material, such as "Nylon".

Also secured to the opposie side of the base plate 24 is a conventional flexible band ring 32 having threaded means 34 which engage lateral slots 35 (FIG. 3) thereof, for adjusting the circumference whereby the strap may be bound firmly around the handlebar 36 of a bicycle (not shown). Also secured to the base plate 24, as by means of a bracket 38 is a light reflector 40.

In operation, the flashlight 14 will be placed in the clip 12 where it is held firmly in place and the flashlight and clip together turned to any direction to be pointed as desired. The high friction of the washer 20 will hold the flashlight in the direction so turned and the resilient characteristics of the washer will absorbe vibrations and prevent inadvertent movement and jarring of the flashlight 16. When the cyclist has reached his destination the flashlight 14 may readily be removed and carried.

Preferably, all components of my flashlight holder are naturally, or are made to be rust proof, weatherproof and non-staining. Moreover, both the clip 12 and the base plate 24 are readily yieldable in the event of a collision.

Figure 4:
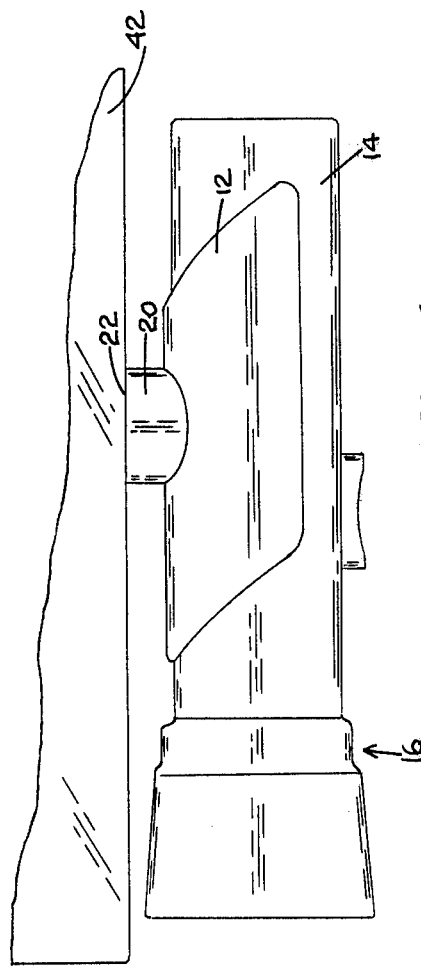
FIG. 4 is a side view of a flashlight holder mounted on a horizontal surface.

The Embodiment of FIG. 4

In this embodiment, the base plate may be removed and the washer 20 bolted to any flat surface, such as the underside of a cupboard 42. Hence, the flashlight may be retained in a handy location, in the kitchen or elsewhere, so that in the event of power failure it may be removed from the clip 12 and carried.

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:

1. A flashlight holder comprising:
   a flexible concave clip adapted to receive and retain a conventional cylindrical flashlight case, the outer surface of said clip being cylindrically convex;
   a resilient washer of a material with a high coefficient of friction;
   a flat surface and a cylindrical concave surface on opposite sides of said washer;
   said clip being nested and interlocked in said concave surface;
   a base plate having planar surfaces;
   a threaded member for clamping said clip and resilient washer to said base plate;
   a nut on said threaded member; and
   a washer having a low coefficient of friction interposed between said nut and base plate to facilitate turning said concave clip and said resilient washer as a unit thereon.

2. The flashlight holder defined by claim 1 including:
   an adjustable flexible band ring secured to said base plate.

3. The flashlight holder defined by claim 1 including:
   light reflecting means carried on said base plate.